United States Patent

[11] 3,548,881

[72] Inventor Amedeo Pavan
 Via Caroncini 15, Milan, Italy
[21] Appl. No. 696,184
[22] Filed Jan. 8, 1968
[45] Patented Dec. 22, 1970
[32] Priority Jan. 12, 1967
[33] Italy
[31] No. 11407A/67

[54] SEAL CLOSURE STRUCTURE, FOR PRESSURE FLUID CONTAINERS, PARTICULARLY FOR PIPELINE TERMINALS
 4 Claims, 11 Drawing Figs.
[52] U.S. Cl. .................................................. 138/89,
  220/57; 292/256.65
[51] Int. Cl. ............................................. F16l 55/10
[50] Field of Search .......................................... 138/89—,
  95; 220/(Inquired), 57, 55P; 215/(Inquired);
  292/(Inquired), 256.65, 256.67, 256.71;
  24/(Inquired), 19; 277/(Inquired)

[56] References Cited
UNITED STATES PATENTS

| | | | |
|---|---|---|---|
| 2,670,799 | 3/1954 | Dobbs | 138/89X |
| 1,958,923 | 5/1934 | Mohler | 292/256.67 |
| 2,174,821 | 10/1939 | Campbell et al. | 292/256.65 |
| 2,338,622 | 1/1944 | Cleveland et al. | 292/256.67 |

FOREIGN PATENTS

| | | | |
|---|---|---|---|
| 486,478 | 11/1929 | Germany | 220/57 |
| 142,021 | 4/1920 | Great Britain | 292/256.67 |

Primary Examiner—Houston S. Bell, Jr.
Attorneys—Guido Modiano and Albert Josif

ABSTRACT: Seal closure structure, for pressure fluid containers, particularly for terminals of pressure fluid pipes such as oil pipelines and the like, comprising a lid member, gasket rings on said lid member for the sealing with the connector part of the container or pipe to which the closure structure is to be applied and radially movable half rings for clamping said lid member on said connector part, said half rings acting on peripheral facing flanges of said lid member and said connector member.

INVENTOR.
AMEDEO PAVAN

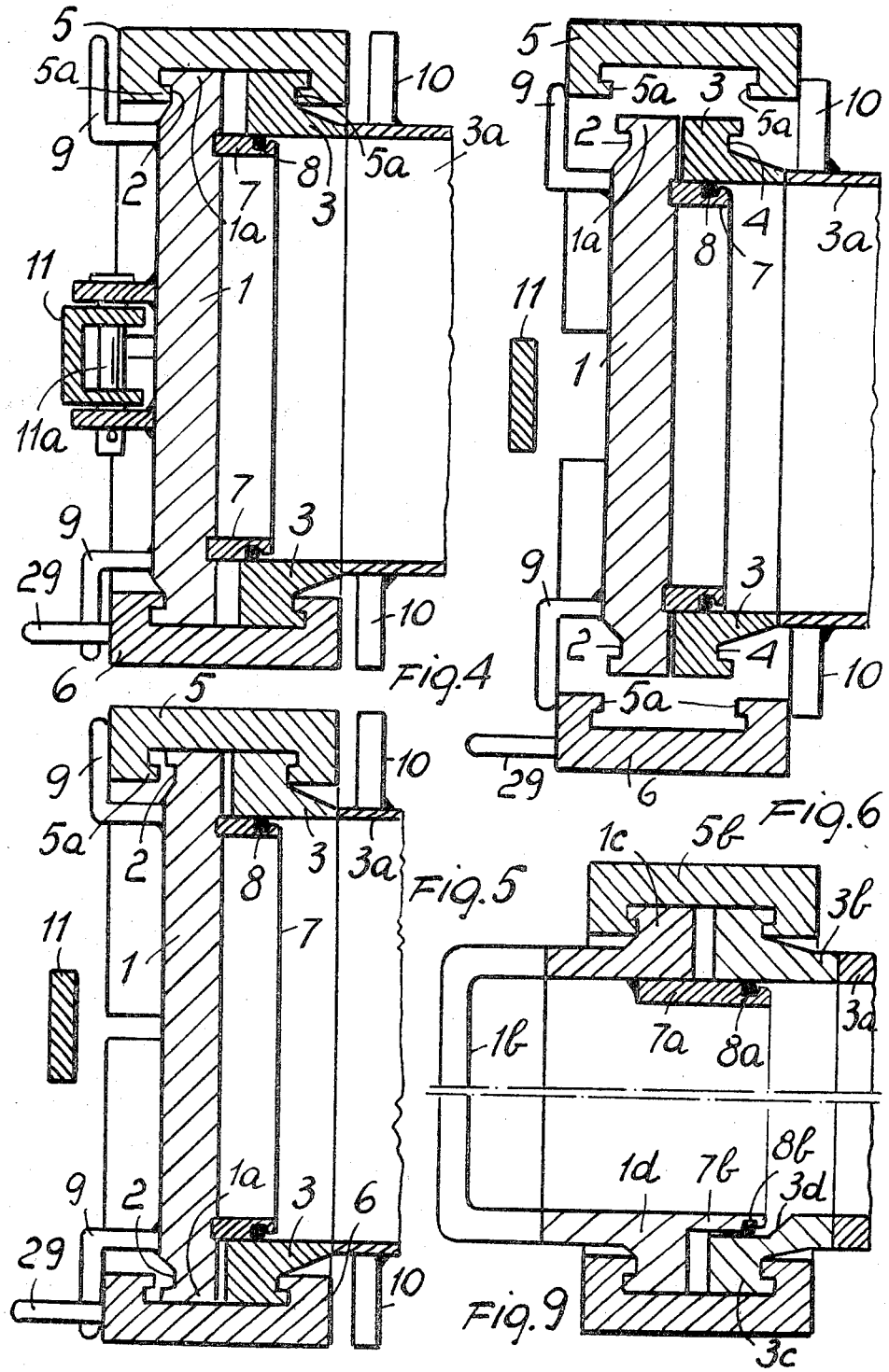

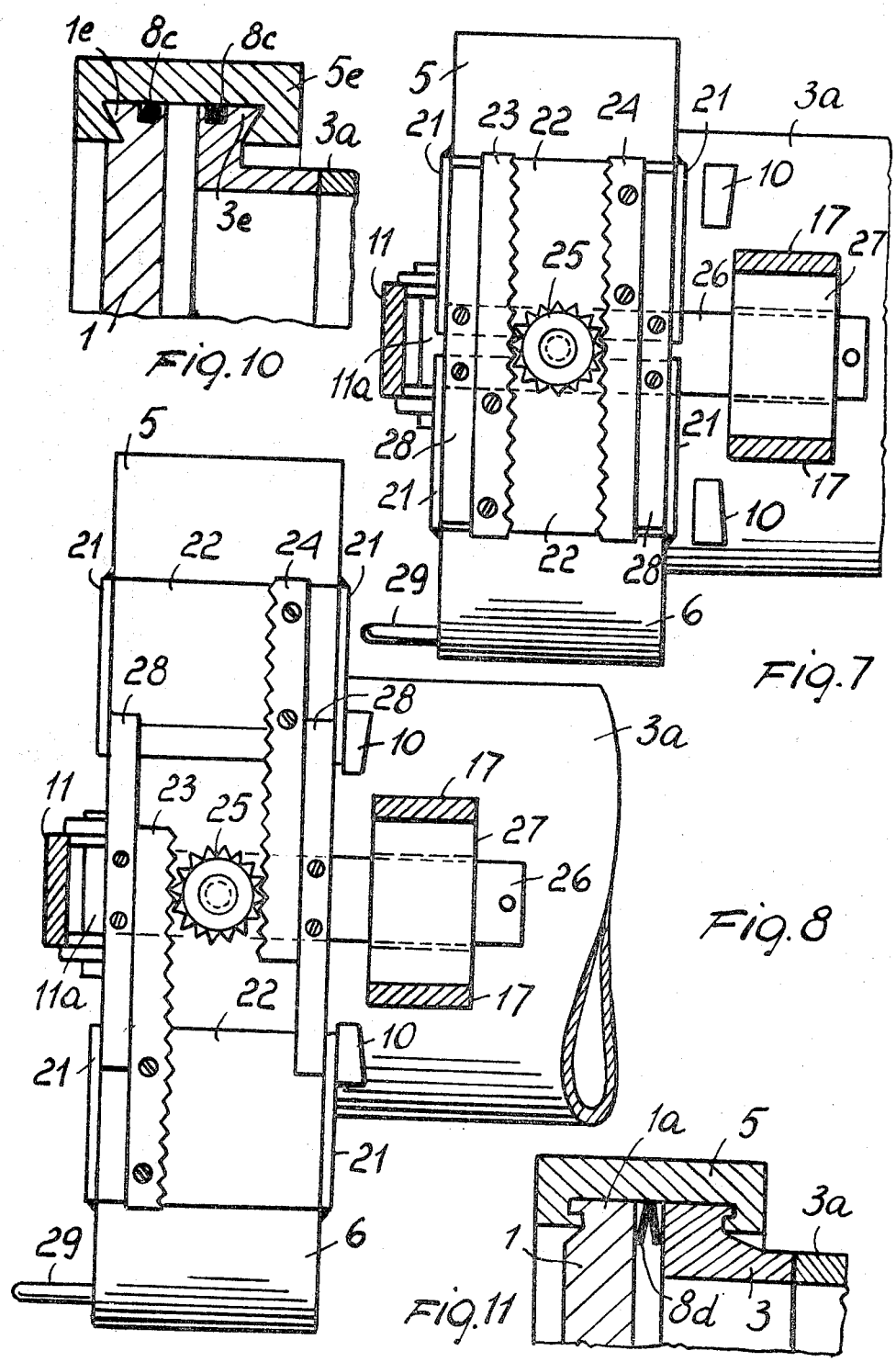

SEAL CLOSURE STRUCTURE, FOR PRESSURE FLUID CONTAINERS, PARTICULARLY FOR PIPELINE TERMINALS

The present invention relates to a seal closure structure for pressure fluid containers, particularly for the closure of the terminals of oil pipelines for the insertion and extraction of cleaning or fluid separation plugs, but is also suitable for the closure of ports in general such as inspection passages, for autoclaves or sterilization containers in general, for industrial filters in which it is necessary to provide for periodic maintenance or replacement of the internal filtering member etc.

Considering, in particular, the terminals of oil pipelines, it is known that they normally comprise a movable seal-closable lid or bottom, by means of which it is possible to insert or extract cleaning plugs or members of the separation of one liquid from another fed successively in the same pipe.

The seal closure of the ends or terminals of oil pipelines is usually achieved by means of bottom plates screwed directly onto the end portions of the pipe, or by means of covers hinged on said end portions and securable in sealed manner by means of a suitable locking system.

In other types, a bottom plate is provided which is removably associated to the terminal flanged portion of the pipe by means of two half rings provided with a V groove arranged so as to enclose the parts to be joined to each other, said half rings being reciprocally approached, in the closure position, adjacent to a vertical plane passing approximately through the axis of the pipe, while the locking is achieved by the use of bolts or suitable clamps or with other like systems.

Said closure systems of known type are subject, however, to some inconveniences, amongst which may be noted a certain difficulty in the opening and closing operations, and this difficulty may be considerably enhanced in the case of large diameter pipes.

Also, the above-indicated known types of closure employing half rings in order to force the lid on the end of the pipe have not given satisfactory practical results in relation to the locking and hydraulic seal, especially when the fluid in the pipe is under high pressure, while the mounting and demounting of said half rings, besides being difficult from the point of view of the actual displacement thereof, involve an appreciable loss of time which is often incompatible with the operational rapidity usually required for the extraction or insertion of cleaning plugs or the like in pipes.

The main object of the present invention is that of eliminating, in substantial measure, the above-indicated inconveniences relative to the closure of the ends of oil pipelines of known type, by providing a closure structure of considerable safeness of working and seal, even when the fluid in the pipe is under high pressures.

Another important object of the invention is that of providing a closure structure which may be operable with extreme ease and rapidity and with a minimum expenditure of muscular force.

These and still other objects are achieved by a closure structure according to the invention which is characterized in that it comprises a bottom or lid provided with a flanging arranged to be associated with a corresponding flanging made fast with the end portion of the union of the container or pipe to which the closure structure is to be applied, two half rings of substantially C-shaped cross section with inwardly facing cavities and appliable in preferably symmetric positions on said flangings, seal means and means for displacing said lid during the opening and closing phases, the width of said cavities of the half rings being preferably greater than the sum of the widths of said flangings in order to allow the centrifugal displacement of said half rings after the reciprocal approachment of said flangings.

Further characteristics and advantages of the invention will appear more clearly from the detailed description of a preferred, but not exclusive, embodiment of a closure structure for the ends of oil pipelines, according to the invention, illustrated by way of nonlimiting example in the accompanying drawings in which:

FIGS. 4, 5 and 6 show axial sectional views of the closure structure in closure position, in an intermediate position and in open position, respectively;

FIGS. 7 and 8 show side views of the closure structure in closure and open position, respectively;

FIG. 9 shows an axial sectional view of a modification of the closure structure;

FIGS. 10 and 11 show detail relative to modified embodiments.

Figure 1:
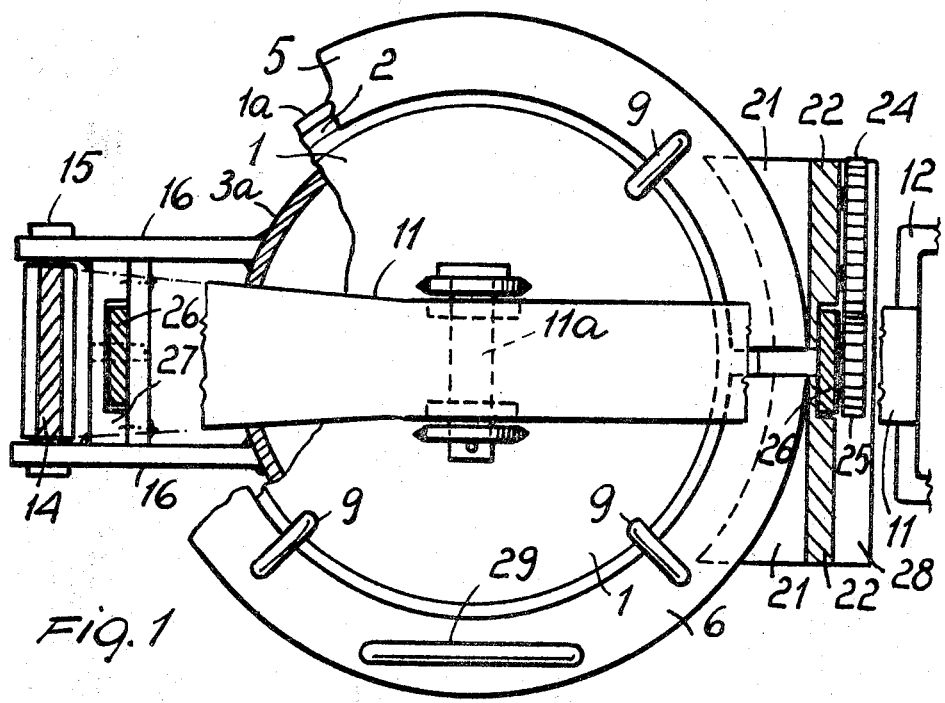
FIG. 1 shows a partially sectioned front elevational view of the closure structure according to the invention.
Figure 2:
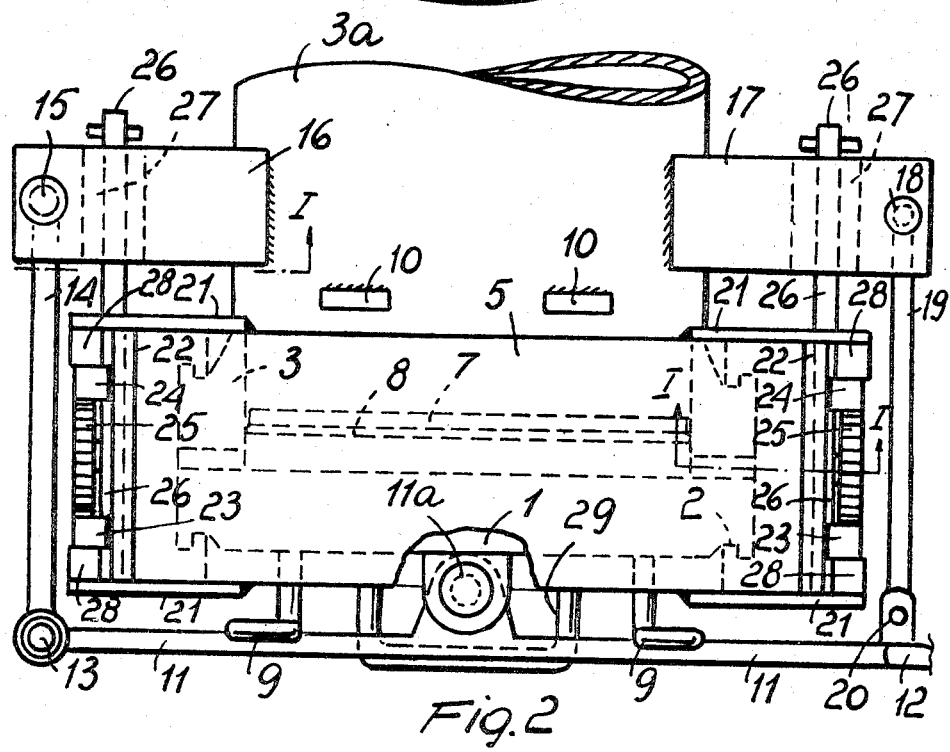
FIG. 2 shows a plan view of the same structure.

With reference to FIGS. 1 to 8, the closure structure according to the invention comprises a bottom or lid 1 formed of a circular plate provided with a peripheral flanging 1a with a circular front groove 2; said flanging is designed to be associated with a corresponding flanging 3 made fast with the connector part 3a of the pipe or of the container to which the closure structure is to be applied. The flanging 3 has a circular rear groove 4 which is externally opposite to said groove 2.

Said flangings 1a and 3 engage, in the closure phase, with two half rings 5 and 6 having a substantially C-shaped cross section so as to define inwardly facing cavities or recesses adjacent to which are inserted the edges of said flangings. The dimensions are chosen in such manner that said cavities have a width or span greater than the sum of the widths of the edges of said flangings 1a and 3, while the turned-over portions 5a of the half rings 5 are arranged to be inserted in said grooves 2 and 4.

The bottom or lid 1 is further provided with a ring 7 or with a corresponding inwardly facing projection having a groove arranged to house a gasket ring 8 of extensible material, such as rubber or the like, designed to adhere to the internal surface of the flanging 3 (such surface is aligned with that of the union or pipe 3a).

As is clearly shown in FIGS. 4, 5 and 6, after the application of the half rings 5 and 6, the fluid pressure in the pipe or container acts on the bottom 1, moving it away from the flanging 3 until the grooves 2 and 4 are engaged with the turned-over portions 5a of said half rings (FIG. 4); in the opening phase, the bottom 1 is instead displaced, as will better be seen hereinafter, in the opposite direction until it adheres to the flanging 3, thus allowing the centrifugal displacement of said half rings 5 and 6 (FIG. 6).

In order to determine the various displacements, substantially L-like projections 9 are secured to the external surface of the bottom 1 and other projections 10 are secured to the pipe 3a. The projections 9 engage with the front parts of the half rings 5 and 6 while the projections 10 serve to stop the said half rings in the final opening phase. The parts of the projections 9 designed to come into contact with the half rings 5 and 6 are arranged, in the closure position, at a distance, from said half rings, less than the interspace existing, always in the closure arrangement, between the flangings 1a and 3 (FIG. 4), so that, by approaching the base 1 towards the flanging 3, there occurs a displacement of said half rings immediately after the disengagement of the groove 2 from the turned-over portions 5a (FIG. 5). The projections 10 serve to limit the axial displacement of the half rings 5 and 6, in the end phase of the opening, in manner such as to avoid reengagement between the groove 2 and the turned-over edges 5a (FIG. 6).

When the half rings 5 and 6 axially reach the positions indicated in FIG. 6, it is possible to space, in centrifugal sense, said half rings from the flangings 1a and 3 so as to allow the removal of the bottom 1.

This latter is articulated in 11a to an arm 11 terminating, at an end, in a handle 12, and, at the other end, adjacent to an articulation 13 associating the said arm 11 to a connecting rod 14 which is articulated, in 15, to some plates 16 secured to the outside of the pipe 3a. Some plates 17 are symmetrically arranged and support an articulation 18, adjacent to which is mounted a shaft 19 whose front end is engageable with the arm 11 by means of a gudgeon pin 20 associated to the structure by means of a chain arranged to allow the insertion and extraction of the gudgeon pin from respective holes provided in the shaft 19 and by projections fast with the arm 11. The length of said shaft 19 is such as to maintain the bottom 1 in the closure position of FIG. 4, when the gudgeon pin 20 is inserted in the respective holes. This arrangement provides a safety closure such that a possible impulsive force may cause an undesired opening in the case of lack of pressure within the pipe.

For the transverse displacement of the half rings 5 and 6 there is provided a device formed of racks associated to said half rings and engaging suitably arranged pinions.

More precisely, the half rings 5 and 6 are arranged, with the parts designed to be mutually approached, in approximately horizontal planes, while laterally to the half rings projecting plates 21 are secured and are interconnected, two by two, by ribs 22. Said plates 21 are arranged symmetrically, as clearly shown in FIG. 3, while the ribs 22 support pairs of racks 23 and 24 (two for each side) arranged offset in vertical direction and engaging with toothed pinions 25 mounted for idle revolution, in substantially horizontal sense, within sleeve guides 27 secured to the pipe 3a. On each side are thus provided: two racks 23—24 made fast to the half rings 6 and 5, respectively, a toothed pinion 25, a sliding shaft or supporting plate 26 and a respective sleeve guide 27.

To each sliding shaft 26 are further secured two transverse guiding bars 28 which are arranged between the racks 23—24 and the end portions of the projecting plates 21. With such arrangement the half rings 5 and 6 may be displaced both in axial sense and in transverse sense; in the first case the guiding bars 28 engaging with the plates 21 determine an analogous displacement of the sliding shafts 26 with the respective toothed pinions 25, while, in the second case, the racks 23, 24 and the plates 21 may slide on said transverse strips 28.

Figure 3:
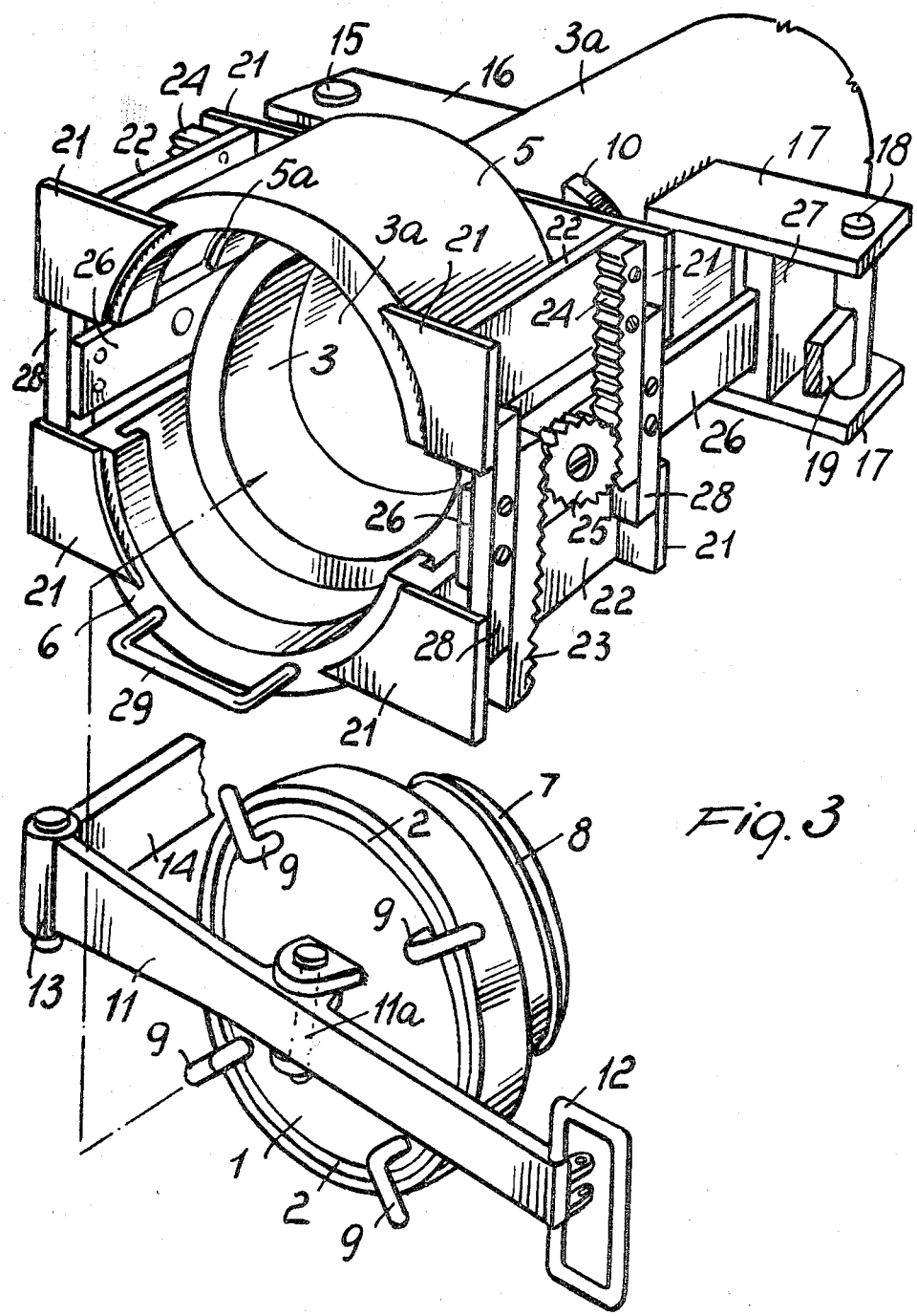
FIG. 3 shows a perspective view of the closure structure in the open position, with the lid shown forwardly displaced for reasons of clarity.

As may readily be appreciated from FIGS. 3, 7 and 8, when the half rings 5 and 6 are disengaged from the flangings 1a and 3, it is possible transversely to displace said half rings, displacing, for example, the lower half ring 6 by acting on a suitable handle 29 secured thereto.

After what has been described, the working of the closure structure according to the invention will readily be apparent.

If it is desired to pass from the closure position (FIGS. 2 and 4) to the opening position (FIGS. 3 and 6), it is necessary firstly to act on the handle 12 (evidently after having removed the gudgeon pin 20) so as to displace the base 1 towards the flanging 3. In this way the arrangement passes from that shown in FIG. 4 to that shown in FIG. 5, through the engagement of the projections 9 with the half rings 5 and 6, and thus the approachment of the bottom 1 to the flange 3 is achieved while the turned-over portions 5a of the half rings are no longer engaged with the circular grooves 2 and 4.

At this point the axial movement ceases and the transverse centrifugal movement of the half rings 5 and 6 may commence. This latter movement occurs simply with a slight manual downwards pressure exerted on the handle 29 fast with the lower half ring 6. The play of the racks 23—24 engaged with the toothed pinions 25 is in fact such as to control the raising of the upper half ring 5 while the lowering of the other half ring 6 occurs (on each side the rack 23 being lowered causes the relative pinion 25 to rotate which causes the raising of the rack 24).

There is thus reached the position of FIG. 6 in which the flangings 1a and 3 are no longer engaged with the half rings 5 and 6, thus permitting the removal, that is the opening, of the bottom 1. This latter may consequently be forwardly displaced by acting on the handle 12 and completely rotating about the articulations 13 and 15.

Obviously the above-described opening phase is executed after the actuation of suitable valves designed to eliminate the pressure inside the pipe 3a.

With the bottom 1 open, it is then possible to insert or extract the cleaning plugs or the separating elements for the fluids, in the case of pipeline terminals.

Evidently the same closure structure may be adopted for a pressure fluid container, such as an autoclave or the like.

The closure phase is achieved with an inversion of the above-described operations.

Thus firstly the bottom 1 is opened against the flanging, acting on the handle 12, thus causing the transverse displacement of the half rings 5 and 6 towards each other by means of the raising of the lower one (6) obtained by manual action on the handle 29. When the half rings 5 and 6 are adhering to the flanging 1a and 3, the bottom 1 is outwardly displaced by acting again on the handle 12, until the turned-over portions 5a of the half rings engage with the grooves 2 and 4. At this point the closure may be said to be completed since the half rings 5 and 6 are hooked to the flangings 1a and 3 and the insertion of a fluid under pressure can do nothing other than push still more the base 1 in longitudinal outward sense, that is against the projection 5a of the half rings 5 and 6, while the seal is ensured by the gasket 8.

For greater safety however there is inserted the gudgeon pin 20 which guarantees the securing of the bottom 1 in the achieved position.

As may be noted, the pressure exerted by the fluid on the gasket ring 8 is conveniently less than that which would occur, at equal diameter of the pipe, on the gasket rings in the known types of closure devices, since in the latter devices the gaskets are arranged externally of the flangings and thus have a greater diameter.

The transverse movement of the half rings 5 and 6 in centrifugal sense may also occur automatically by slightly unbalancing the weights of the said half rings in manner such that, due to gravity, the lower half ring tends to be lowered as soon as the unhooking relative to the flangings 1a and 3 occurs.

According to a variation, the half rings 5 and 6 may be arranged with the respective portions designed to approach each other situated in a substantially vertical plane (the half rings 5 and 6 would thus be rotated through 90° with respect to the position shown in the accompanying drawings).

In FIG. 9 modified embodiments of the closure structure according to the invention are shown.

According to such modifications, the bottom 1b is provided of cap-type with flanging 1c similar to that provided in the previously described bottom; analogously the pipe 3a is provided with a flanging 3b similar to that described above. Said flanging 1c and 3b engage with half rings 5b provided with axial and transverse movements as described above.

The seal gasket 8a is arranged on an annular projection 7b rigid with the flanging 1d of the bottom 1b, the said annular projection being aligned adjacent its internal surface to the internal surface of the pipe 3a. In such case the flanging 3c of the end part of the pipe is correspondingly provided with a cavity 3d designed to house the gasket 8b.

FIG. 10 shows a modification according to which the bottom 1 and the pipe 3a are provided with flangings 1e and 3e dovetailing peripherally of the seal gaskets 8c, while the half rings 5c are provided with the section of the cavities also substantially dovetailed.

In FIG. 11 is finally shown another modification consisting in the provision of a substantially V-like seal gasket 8d arranged adjacent the interspace between the flanging 1a and 3.

The invention as thus conceived may be subjected to various modifications and variations all lying within the ambit of the inventive concept.

Thus, for example, the closure structure according to the invention may be applied, with obvious modifications, in the case of pipe joints.

In practice the materials used as well as the dimensions may be varied according to needs and all the parts may be replaced by other technically equivalent means.

I claim:

1. A seal closure structure for ports of containers or terminals or pressure fluid pipes, in particular oil pipelines, wherein the port or terminal has a connector member formation and the closure structure has a lid member cooperating with said connector member formation and including gaskets for tightly closing the open end of said connector member and radially movable lid retaining half ring sections having a C-shaped radial cross section with an inner recess having lateral engagement walls and wherein the lid member has a first flange formation on its outside periphery and said connector formation has on its outside periphery a second flange formation opposite to said first flange formation when the lid member is in its closing position, wherein, according to the improvement, said recess has a span greater than the thicknesses of at least the most external peripheral edges of said first and second flange formations thereby loosely receiving said first and said second flange formations in one closing position of said lid member to prevent within limits removal of said lid member therefrom, means for displacing said ring section members at least in a direction radial to said connector member, when said lid member is in at least another closing position thereof, and means for imparting to said lid member and said connector member formation a relative motion to control the spacing between each other and the engagement of said flange formations with said walls of said recess.

2. A structure according to claim 1, wherein said flange formations have circular grooves on opposite faces extending in surfaces perpendicular to the axis of said connector member formation, said grooves being adapted to receive facing annular edges of the C-shape of said ring sections when said lid member is in a closing position thereof.

3. A structure according to claim 1, further comprising a pivoting locking arm for said lid member, hinge means for said arm supported on said connector member and locking means for locking said arm when the lid member is in its closing position.

4. A structure according to claim 1, wherein said half ring sections are arranged in diametrically opposite positions with respect to said connector member thereby defining a mean diameter intersecting said opposite positions and wherein said means for displacing said ring sections comprise at least on one side of said connector member mutually spaced racks respectively rigid with said half ring members and extending parallel to said mean diameter, a common pinion for said racks arranged therebetween and in mesh with said racks, a supporting plate slidable in the longitudinal direction of said connector member and rotatably supporting said pinion, guide means for said racks parallel to said mean diameter and supported on said supporting plate, thereby to obtain a radial movement of said half rings rigid with said racks parallel to said mean diameter when said pinion is rotated and a movement of said half rings, said pinion and said guide means parallel to said longitudinal direction when said slidable supporting plate is moved in said longitudinal direction.